(12) United States Patent
Nair et al.

(10) Patent No.: US 11,030,674 B2
(45) Date of Patent: Jun. 8, 2021

(54) COGNITIVE ORDER PROCESSING BY PREDICTING RESALABLE RETURNS

(71) Applicant: INTERNATIONAL BUSINESS MACHINES CORPORATION, Armonk, NY (US)

(72) Inventors: Mukesh M. Nair, Chelmsford, MA (US); Peter E. Stubbs, Georgetown, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 279 days.

(21) Appl. No.: 15/487,507

(22) Filed: Apr. 14, 2017

(65) Prior Publication Data
US 2018/0300796 A1    Oct. 18, 2018

(51) Int. Cl.
| | |
|---|---|
| *G06Q 30/06* | (2012.01) |
| *G06Q 30/02* | (2012.01) |
| *G06Q 50/00* | (2012.01) |
| *G06N 20/00* | (2019.01) |

(52) U.S. Cl.
CPC ..... *G06Q 30/0633* (2013.01); *G06Q 30/0201* (2013.01); *G06Q 30/0202* (2013.01); *G06Q 30/0206* (2013.01); *G06N 20/00* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 8,015,081 B1* | 9/2011 | Franco | G06Q 10/08 705/26.1 |
| 8,291,016 B1 | 10/2012 | Whitney et al. | |
| 10,157,392 B1* | 12/2018 | Ferdowsi | G06Q 30/0206 |
| 2003/0061128 A1 | 3/2003 | Lin et al. | |
| 2005/0086127 A1 | 4/2005 | Hastings et al. | |
| 2010/0299361 A1 | 11/2010 | Geney et al. | |

(Continued)

FOREIGN PATENT DOCUMENTS

| | | |
|---|---|---|
| EP | 1316906 A1 | 6/2003 |
| EP | 002254088 A1 | 11/2010 |

(Continued)

OTHER PUBLICATIONS

Potdar, Amit and Rogers, Jamie, Department of Industrial and Manufacturing Systems Engineering, The Univ of Texas at Arlington, Arlington, TX—USA., Methodology to Forecast Product Returns for the Consumer Electronics Industry, 2010 Portland International Conference on Management of Engineering (Year: 2010).*

(Continued)

*Primary Examiner* — Patricia H Munson
*Assistant Examiner* — Chesiree A Walton
(74) *Attorney, Agent, or Firm* — Stephanie Carusillo; George S. Blasiak; Heslin Rothenberg Farley & Mesiti PC

(57) ABSTRACT

Methods, computer program products, and systems are presented. The methods include, for instance: collecting data corresponding to factors that affect a resalable return rate of the item. By predicting the resalable return rate based on the factors and respective contribution of the factors, number of total units of the item is adjusted.

20 Claims, 5 Drawing Sheets

(56) References Cited

U.S. PATENT DOCUMENTS

| | | | | |
|---|---|---|---|---|
| 2012/0284084 | A1* | 11/2012 | Popkov | G06Q 10/04 705/7.31 |
| 2013/0179220 | A1 | 7/2013 | Notani et al. | |
| 2014/0244361 | A1 | 8/2014 | Zhang et al. | |
| 2014/0278771 | A1 | 9/2014 | Rehman et al. | |
| 2015/0095111 | A1* | 4/2015 | Tang | G06Q 30/0202 705/7.31 |
| 2016/0148226 | A1* | 5/2016 | Popescu | G06Q 30/0202 705/7.31 |
| 2018/0165611 | A1* | 6/2018 | Saxena | G06N 20/00 |

FOREIGN PATENT DOCUMENTS

| | | |
|---|---|---|
| JP | 6278867 B2 * | 2/2018 |
| WO | 2007102794 A3 | 4/2009 |
| WO | 2013082527 A1 | 6/2013 |

OTHER PUBLICATIONS

Fleischmann, Moritz, et al; "Controlling inventories with stochastic item returns: A basic model." European journal of operational research 138.1 (2002): 63-75.

Toktay, Beri, et al., "Forecasting Product Returns" URL: <http://www.prism.gatech.edu/~bt71/articles/forecasting.pdf>, Technology Management, INSEAD, 24 pgs.

Zhang, Dennis J., "The Operational Value of Social Media Information" [retrieved from the Internet on Nov. 17, 2015]. Retrieved from the Internet: URL <www.ruomengcui.com/wp-content/uploads/2015/08/slides_socialmedia.pdf>, Northwestern University, 9 pgs.

"Clear Returns Uses IBM Big Data & Analytics to help retailers predict and understand the impact of returns" [retrieved from the Internet on Apr. 3, 2017]. Retrieved from the Internet: URL <https://www-03.ibm.com/press/uk/en/pressrelease/47266.wss>, IBM, London, U.K.—Jul. 3, 2015, 3 pgs.

"Forecasting Returns Pays High Dividends" [retrieved from the Internet on Apr. 3, 2017]. Retrieved from the Internet: URL <http://www.retalon.com/wp-content/uploads/2012/09/Retalon-Forecasting-Returns.pdf>, RETALON, 2 pgs.

Mell, Peter, et al., "The NIST Definition of Cloud Computing", NIST Special Publication 800-145, Sep. 2011, Gaithersburg, MD, 7 pgs.

* cited by examiner

COGNITIVE ORDER PROCESSING BY PREDICTING RESALABLE RETURNS

TECHNICAL FIELD

The present disclosure relates to cognitive analysis technology, and more particularly to methods, computer program products, and systems for predicting resalable returns of an item in order to maximize profit from retail orders of the item.

BACKGROUND

In conventional retail systems, orders are placed according to available unit numbers for sale. Accordingly, such retail systems may not accept orders for items out of stock at the moment, which lead to lost sales.

SUMMARY

The shortcomings of the prior art are overcome, and additional advantages are provided, through the provision, in one aspect, of a method. The method for adjusting a number of total units of an item includes, for example: collecting, by one or more processor, data corresponding to factors that affect a resalable return rate of the item, wherein the resalable return rate indicates a rate of returned order for the item in a resalable condition over an entire order for the item; formulating, by the one or more processor, respective contribution to the resalable return rate by each factor from the factors; predicting, by the one or more processor, the resalable return rate by use of the respective contribution per factor for the factors and the data corresponding to the factors; and adjusting, by the one or more processor, the number of total units of the item by a number of units of the item pursuant to the resalable return rate from the predicting.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
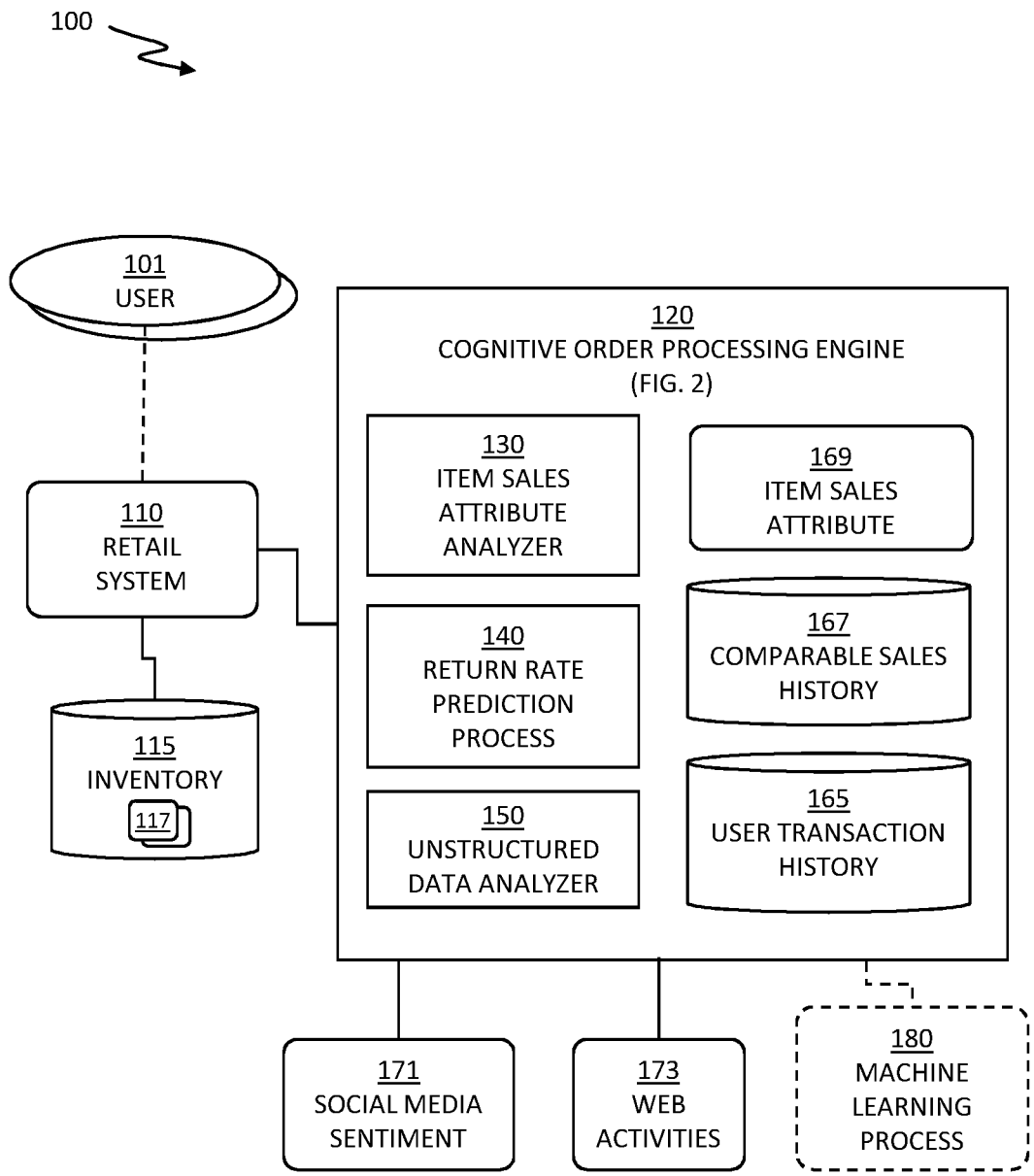
FIG. 1 depicts a system for cognitively processing retail orders of an item by predicting a resalable return rate, in accordance with one or more embodiments set forth herein.

FIG. 1 depicts a system 100 for cognitively processing retail orders of an item by predicting a resalable return rate, in accordance with one or more embodiments set forth herein.

The system 100 providing cognitive unit-number adjustment services includes a cognitive order processing engine 120 and a retail system 110 which is directly and/or indirectly coupled to the cognitive order processing engine 120. A user 101 is one from one or more user accesses to the retail system 110 in order to place an order for an item 117 among a plurality of items offered by the retail system 110. Examples of the retail system 110 may include, but are not limited to, an e-commerce system, a mobile commerce system, call center order system, etc. An inventory 115 of the retail system 110 collectively indicates records on a total number of units of the item 117 that are available for sale at a specific time, the records corresponding to respective to the plurality items. Conventionally, the retail system 110 may accept orders for the item 117 only within a number of total units available for the item 117 as logged in the inventory 115. Accordingly, when the item 117 is out of stock according to the number of total units in the inventory 115, the retail system 110 stops accepting orders for the item 117.

The cognitive order processing engine 120 may cognitively adjust the number of total units for the item 117 in the inventory 115 by predicting a number/ratio of items to be returned in resalable condition and by increasing the units of the item 117 accordingly. In this specification, the term "resalable return rate" indicates how many of the items sold would be returned in resalable condition, which may be sold as a new at a full price, in proportion to a total number of items sold.

The cognitive order processing engine 120 includes an item sales attribute analyzer 130, a resalable return rate prediction process 140, and an unstructured data analyzer 150. The cognitive order processing engine 120 collects data that may contribute to the resalable return rate, including a user transaction history 165, a comparable sales history 167, and item sales attributes 169 corresponding to respective items. The user transaction history 165 indicates a collective transaction histories for all users who had purchased the item 117. Based on the fact that users who often return purchased items may return the item 117 as well, collective return records of all the users who had purchased the item 117 would be accounted as a factor of a resalable return rate of the item 117. The comparable sales history 167 of the item 117 indicates collective sales histories and past patterns of returns of items comparable to the item 117 with respect to the sales attributes. The item sales attributes 169 indicate attributes of sales describing how the item sells such as whether or not the item 117 is seasonal, a ratio of sales volume over a period time, which is referred to as a sales speed in this specification, when the markdown of price begins after the launch of the item, etc.

The resalable return rate may be further affected by various comments on the item and responses to the item as appearing in unstructured data on various network media, and the cognitive order processing engine 120 further collects the unstructured data including a social media sentiment 171, and web activities 173 such as web searches for the item 117, blog postings commenting on the item 117, etc. The cognitive order processing engine 120 subsequently analyzes the unstructured data by use of various natural language analysis and classification tools and quantifies positive and negative occurrences to the item 117 as scores. The cognitive order processing engine 120 respectively weighs transactional and historical data 165, 167, 169 as well as values/scores derived from the unstructured data 171, 173 for their respective contribution to the resalable return rate of the item. The cognitive order processing engine 120 subsequently predicts the resalable return rate and adjust the number of total units in the inventory 115 of the item 117 accordingly. The margin of error in predicting the resalable return rate, a time delay involved in the return shipping, examination, restocking, and reshipping of the item to a new user may be automatically and/or manually configured either to guarantee timely shipment to users buying from the predicted number of total units or to maximize profit margin. The cognitive order processing engine 120 may further calculate trade-offs between the guarantee of timely shipment and the maximum profit, and/or inform the users buying from the predicted returns of a flexible shipment schedule different from a regular shipments shipping from in-stock items.

The cognitive order processing engine 120 may submit the predicted resalable return rate for the item 117 and data 165, 167, 169, 171, and 173, used in predicting the resalable return rate as training data to a machine learning process 180 such that the predicted resalable return rate would improve in accuracy over time.

For example, where the item is a seasonal clothing that may be sold at a full price of two hundred dollars ($200) by a certain date for a very short period of time such as a holiday sweater, etc. Historically, about thirty percent (30%) of seasonable clothing similar to the item have been returned in new condition within a week after the delivery and was resalable to other customers. When the retail system 110 goes out of stock with the item at the peak of the season, the retail system 110 conventionally may not receive any more orders, but by use of the cognitive number of total units adjustment services, the retail system 110 may accept orders for extra 30% of the sales volume of last week. Accordingly, the retail system 110 may fully utilize the season for the item during which the item may be sold at a full price.

Figure 2:
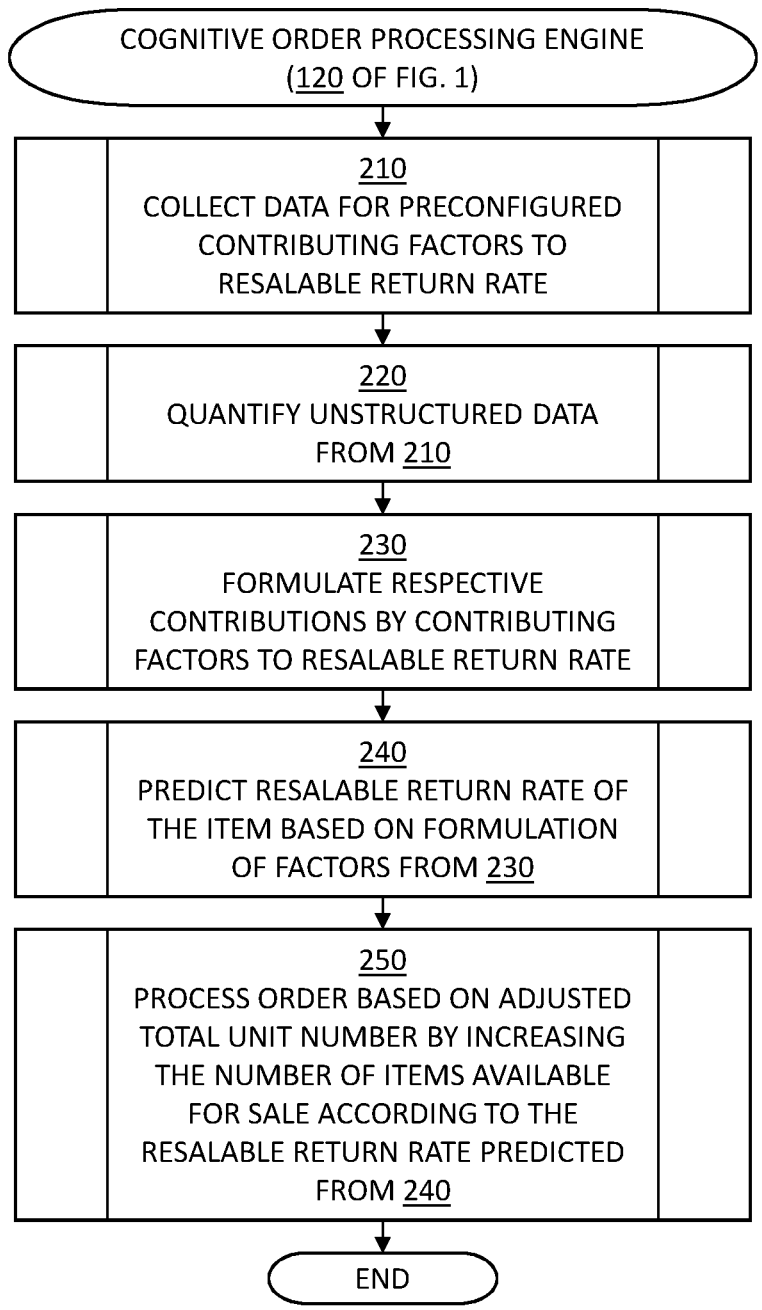
FIG. 2 depicts a flowchart performed by the cognitive order processing engine of the system, in accordance with one or more embodiments set forth herein.

FIG. 2 depicts a flowchart performed by the cognitive order processing engine 120 of FIG. 1, in accordance with one or more embodiments set forth herein.

In block 210, the cognitive order processing engine 120 collects input data for preconfigured contributing factors to a resalable return rate of an item. The contributing factors may include, but are not limited to, one or more sales attribute of the item, sales histories of comparable items having similar sales attributes and/or sales histories of the item in the past, transaction histories of users who buy the item, social media sentiment on the item, web activities relevant to the item such as searches, reviews, blog postings, news articles, etc. Examples of the sales attributes may be, but not limited to, whether or not the item is seasonal, sales volume over a fixed period of time indicating the speed of sales, as well as concentration pattern of the sales volume, etc. Then the cognitive order processing engine 120 proceeds with block 220.

In block 220, the cognitive order processing engine 120 quantifies the input data from block 210, including the social media sentiment on the item and the web activities relevant to the item. The cognitive order processing engine 120 may assign a certain score corresponding to a range of values in the past sales histories of the item and/or comparable items, a level of similarity based on overlapping sales attributes, a number of returns by a certain user, etc. The cognitive order processing engine 120 also quantifies the unstructured input data by first analyzing the unstructured data by use of natural language analysis tools to determine meanings of the unstructured input data as well as sentiments on the item as expressed in the unstructured input data. The cognitive order processing engine 120 subsequently may associate a certain score for negative and/or positive responses toward the item expressed in the input data. Then the cognitive order processing engine 120 proceeds with block 230.

In block 230, the cognitive order processing engine 120 formulates respective contributions by the contributing factors to the resalable return rate of the item. For example, in certain embodiments of the present invention, the cognitive order processing engine 120 may assign twice as much weight for the sales histories of the item in the past and assign a half of the weight for the past sales histories for the rest of contributing factors, respectively. For another example, in certain embodiments of the present invention, the cognitive order processing engine 120 may assign five times more weight for a news report coverage on the item if the item is trendy and seasonal. In certain embodiments of the present invention, the formulation of respective contribution, that is respective weights toward the resalable return rate prediction, may be adjusted based on sales record evaluation after a certain period of running the cognitive order processing engine 120 by use of machine learning process. Then the cognitive order processing engine 120 proceeds with block 240.

In block 240, the cognitive order processing engine 120 predicts the resalable return rate of the item by accumulating respective contributions by each contributing factor for all contributing factors from block 230. The cognitive order processing engine 120 may further calculates the additional number of items based on a current number of total units of the item and the predicted resalable return rate of the item. Then the cognitive order processing engine 120 proceeds with block 250.

In block 250, the cognitive order processing engine 120 processes orders based on adjusted number of total units of the item, as increasing the number of items available for sale according to the resalable return rate predicted from block 240. In certain embodiment of the present invention, the cognitive order processing engine 120 may incorporate a prospective delay, including a duration necessary for a return of the item, that is a return delay, and a processing time for examination and restocking of the item, that is a processing delay, into account in adjusting the available number of total units, and updates the number of total units after the prospective delay rather than immediately adjusting the number of total units, or updates the number of total units along with the prospective delay to process upcoming purchase orders more effectively. For example, if the cognitive order processing engine 120 detects that past returns from a user have been numerous and immediate for certain items, then the cognitive order processing engine 120 may account part of an order shipped for the user would be available for resale in a week, including a typical return shipping period, examination for the condition of the item, processing and shipping to another customer who placed an order for the item in the meantime, and update the number of total units as available for shipping in one week. Then the cognitive order processing engine 120 terminates processing the inputs from block 210.

In certain embodiments of the present invention, the cognitive order processing engine 120 may periodically evaluate the respective contributions of the contributing factors to the resalable return rate based on the collection of input data and a sales record of a past season in order to predict the resalable return rate of the item more accurately.

Certain embodiments of the present invention may offer various technical computing advantages, including automated prediction of a resalable return rate based on various factors according to respective contribution of the factors. Certain embodiments of the present invention includes unstructured data in the contributing factors to the resalable return rate, processes unstructured data by use of natural language tools, and quantifies respective levels of contribution by the unstructured data. Also by use of multithreading and/or multiprocessing, cognitive number of total units adjustment services may be concurrently rendered for any number of items and/or retail systems. Certain embodiments of the present invention may be implemented by use of a cloud platform/data center, and the cognitive number of total units adjustment service may be provided as a subscribed service for retail system clients. Certain embodiments of the present invention improves the profit of the retail companies and manufactures of the items by providing opportunities to increase peak season sales at full price by reliably predicting returns that may be accounted as available number of total units.

Figure 3:
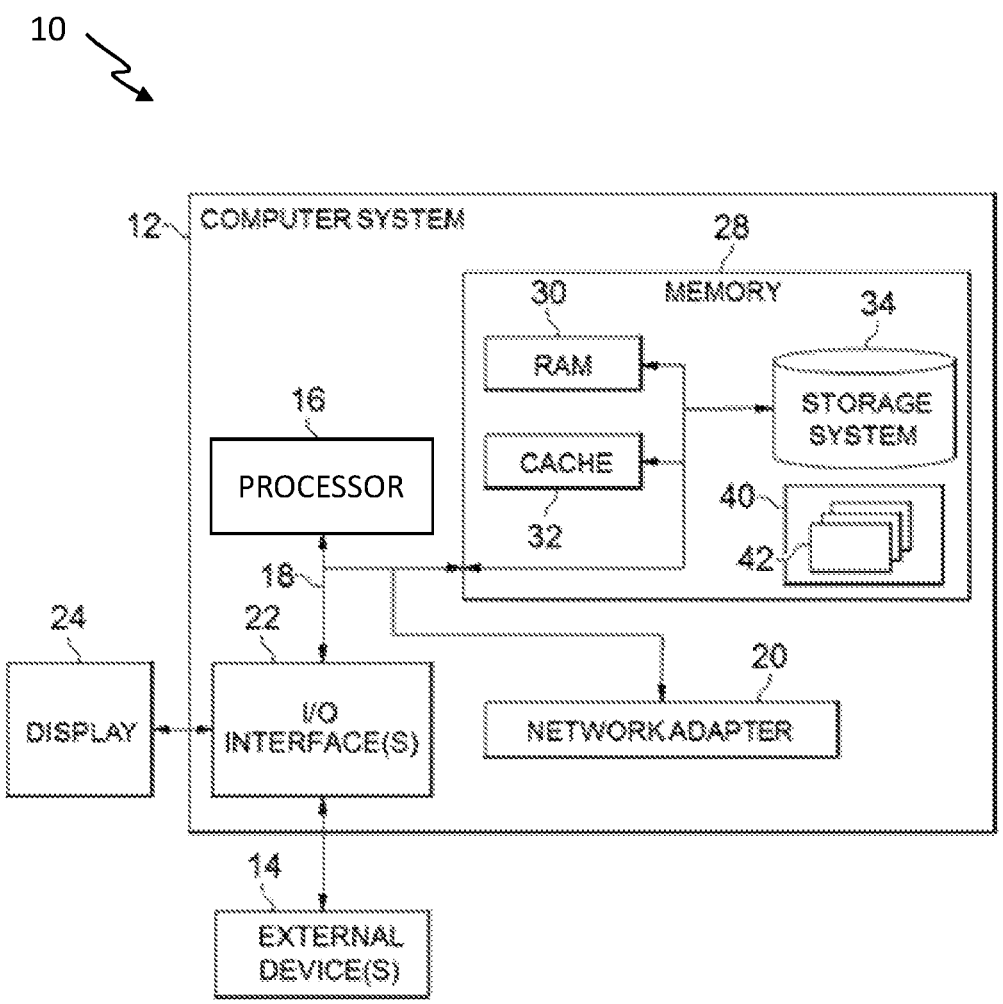
FIG. 3 depicts a cloud computing node according to an embodiment of the present invention.
Figure 4:
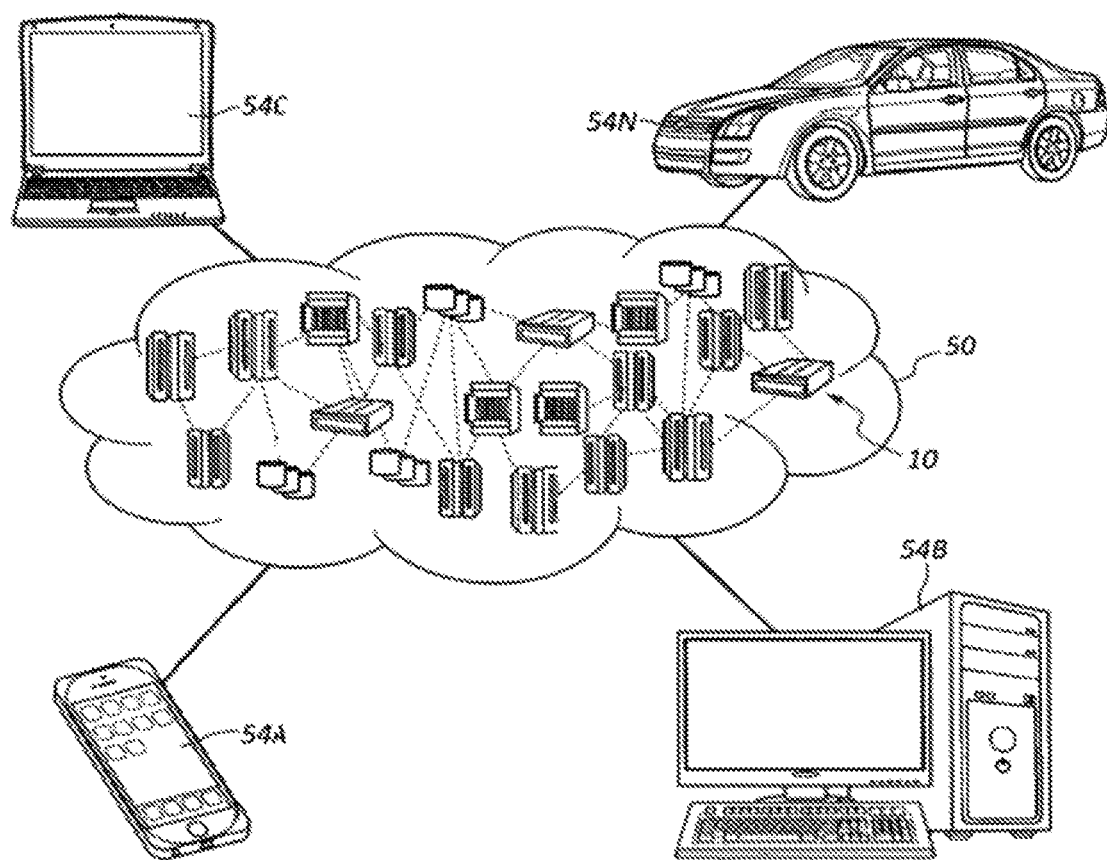
FIG. 4 depicts a cloud computing environment according to an embodiment of the present invention.
Figure 5:
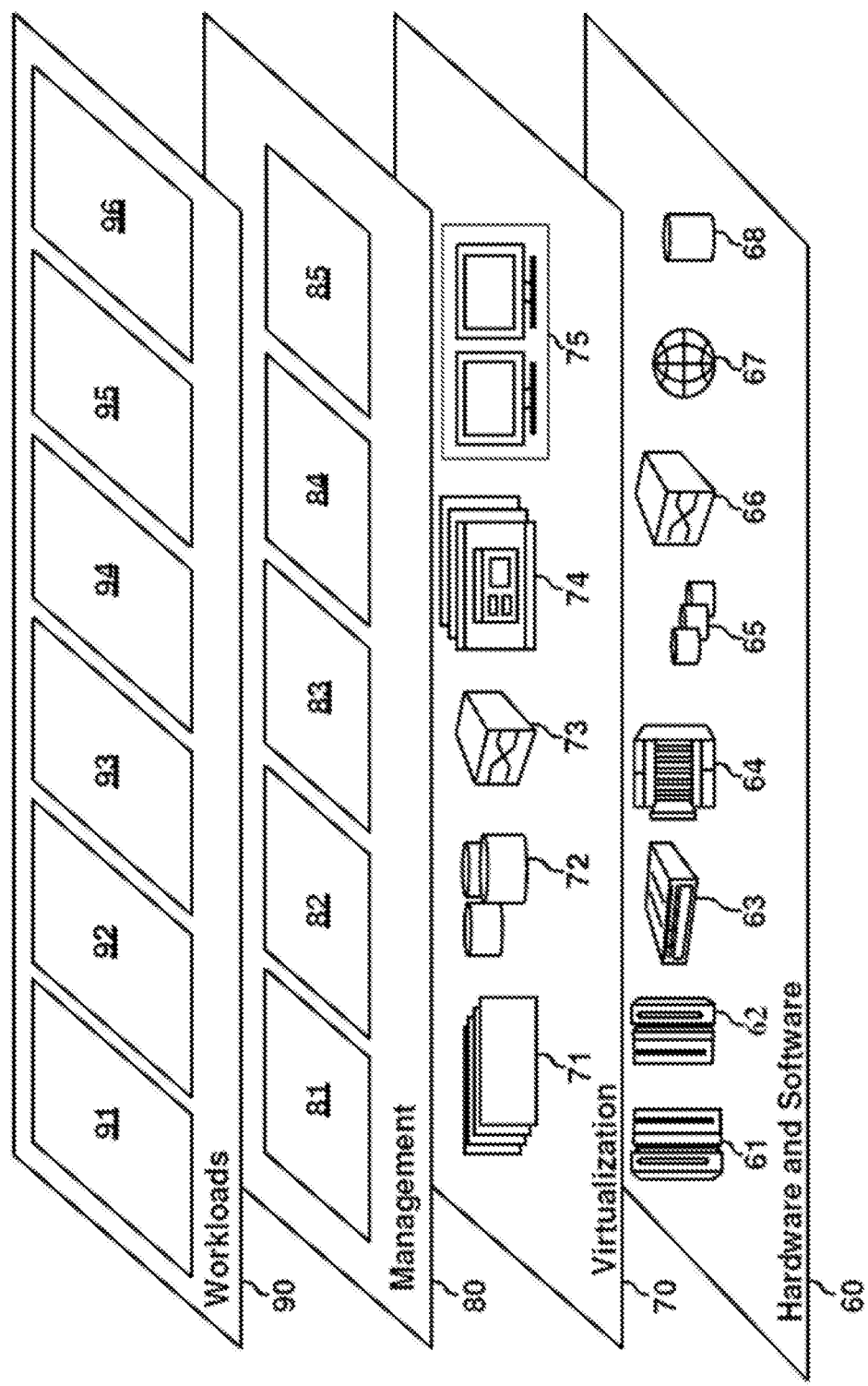
FIG. 5 depicts abstraction model layers according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive order processing engine 120 of FIG. 1. Program processes 42, as in the cognitive order processing engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive order processing engine 96, as described herein. The processing components 96 can be understood as one or more program 40 described in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for adjusting a number of total units of an item, comprising:
   identifying users who have ordered the item;
   ascertaining items similar to the item;
   finding unstructured data of the item including unstructured data social media content relevant to the item and unstructured data web searches for the item;
   performing natural language processing on the unstructured data social media content relevant to the item
   subjecting to natural language processing the unstructured data web searches for the item;
   collecting data corresponding to a plurality of factors that affect a resalable return rate of the item, wherein the resalable return rate indicates a rate of returned order for the item in a resalable condition over an entire order for the item, wherein the plurality of factors include (a) a first factor provided by a user transaction history indicates collective past transactions including past returns of acquired items other than the item by the users who have ordered the item, (b) a second factor provided by a comparable sales history that indicates collective sales histories and past patterns of returns of the items similar to the item in terms of sales attributes, (c) a third factor provided by a sales attribute item that indicates a sales volume of the item over a fixed period of time and whether the item is seasonal or not seasonal, (d) a fourth factor provided by a social media factor indicating social media sentiment of the item as determined by the performing natural language processing, and (e) a fifth factor provided by a web search activities factor indicating a web search sentiment of the item as determining by the subjecting to natural language processing;
   formulating respective contribution to the resalable return rate by each factor from the factors, wherein the formulating comprises assigning a first weight to the first factor, a second weight to the second factor, a third weight to the third factor, a fourth weight to the fourth factor, a fifth weight to the fifth factor;
   evaluating a first sales record of the item after a first sales period;
   adjusting the respective weights associated to the first through fifth factors based on the evaluating the first sales record of the item after a first sales period by use of a machine learning process upon completion of the first sales period the item;
   performing evaluation of a second sales record of the item after a second sales period;
   readjusting the respective weights associated to the first through fifth factors based on the performing evaluation of a second sales record of the item after a second sales period by use of the machine learning process upon completion of the second sales period the item;
   predicting the resalable return rate by use of the respective contribution per factor for the factors as determined by the readjusting, and the data corresponding to the factors; and
   performing adjustment of the number of total units of the item by a number of units of the item pursuant to the resalable return rate from the predicting, wherein the method includes applying data of the first through fifth factors as training data to the machine learning process and re-predicting the resalable return rate subsequent to the applying data of the first through fifth factors as training data to the machine learning process, wherein the re-predicting, by the applying data of the first through fifth factors as training data to the machine learning process, is more accurate than the predicting.

2. The computer implemented method of claim 1, wherein the method includes examining transaction history data of a certain user of the users who have ordered the item, determining that the certain user has immediately returned numerous past ordered acquired items, and increasing the total number of units of the item based on the determining that the certain user has immediately returned numerous past ordered acquired items.

3. The computer implemented method of claim 1, wherein the method further includes, adjusting a number of total units of a second item, the adjusting a number of total units of a second item comprising: identifying users who have ordered the second item; ascertaining items similar to the second item; finding unstructured data of the second item including unstructured data social media content relevant to the second item and unstructured data web searches for the second item; performing natural language processing on the unstructured data social media content relevant to the second item subjecting to natural language processing the unstructured data web searches for the second item; collecting data corresponding to a plurality of factors that affect a resalable return rate of the second item, wherein the resalable return rate indicates a rate of returned order for the second item in a resalable condition over an entire order for the second item, wherein the plurality of factors include (a) a first factor provided by a user transaction history indicates collective past transactions including past returns of acquired items other than the second item by the users who have ordered the second item, (b) a second factor provided by a comparable sales history that indicates collective sales histories and past patterns of returns of the items similar to the second item in terms of sales attributes, (c) a third factor provided by a sales attribute item that indicates a sales volume of the second item over a fixed period of time and whether the second item is seasonal or not seasonal, (d) a fourth factor provided by a social media factor indicating social media sentiment of the second item as determined by the performing natural language processing, and (e) a fifth factor provided by a web search activities factor indicating a web search sentiment of the second item as determining by the subjecting to natural language processing; wherein the item is not seasonable, and wherein the second item is seasonable, wherein the method includes determining that the second item is seasonable, and wherein the method includes responsively to the determining that the second item is seasonable, increasing the weight that is assigned to the fifth factor provided by a web search activities factor indicating a web search sentiment of the second item as determined by the subjecting to natural language processing.

4. The computer implemented method of claim 1, wherein the method includes examining transaction history data of a certain user of the users who have ordered the item.

5. The computer implemented method of claim 1, wherein the method further includes, adjusting a number of total units of a second item, the adjusting a number of total units of a second item comprising: identifying users who have ordered the second item; ascertaining items similar to the second item; finding unstructured data of the second item including unstructured data social media content relevant to the second item and unstructured data web searches for the second item; performing natural language processing on the unstructured data social media content relevant to the second item subjecting to natural language processing the unstructured data web searches for the second item.

6. The computer implemented method of claim 1, wherein the method further includes, adjusting a number of total units of a second item, the adjusting a number of total units of a second item comprising identifying users who have ordered the second item.

7. The computer implemented method of claim 1, wherein the method includes examining transaction history data of a certain user of the users who have ordered the item, determining that the certain user has immediately returned numerous past ordered acquired items, and increasing the total number of units of the item.

8. The computer implemented method of claim 1, wherein the method further includes, adjusting a number of total units of a second item, wherein the item is not seasonable, and wherein the second item is seasonable, wherein the method includes determining that the second item is seasonable, and wherein the method includes responsively to the determining that the second item is seasonable, increasing the weight that is assigned to a factor provided by a web search activities factor indicating a web search sentiment of the second item as determined by the subjecting to natural language processing.

9. A computer program product comprising:
  a computer readable storage medium readable by one or more processing circuit and storing instructions for execution by one or more processor for performing a method for adjusting a number of total units of an item, comprising:
  identifying users who have ordered the item;
  ascertaining items similar to the item;
  finding unstructured data of the item including unstructured data social media content relevant to the item and unstructured data web searches for the item;
  performing natural language processing on the unstructured data social media content relevant to the item subjecting to natural language processing the unstructured data web searches for the item;
  collecting data corresponding to a plurality of factors that affect a resalable return rate of the item, wherein the resalable return rate indicates a rate of returned order for the item in a resalable condition over an entire order for the item, wherein the plurality of factors include (a) a first factor provided by a user transaction history indicates collective past transactions including past returns of acquired items other than the item by the users who have ordered the item, (b) a second factor provided by a comparable sales history that indicates collective sales histories and past patterns of returns of the items similar to the item in terms of sales attributes, (c) a third factor provided by a sales attribute item that indicates a sales volume of the item over a fixed period of time and whether the item is seasonal or not seasonal, (d) a fourth factor provided by a social media factor indicating social media sentiment of the item as determined by the performing natural language processing, and (e) a fifth factor provided by a web search activities factor indicating a web search sentiment of the item as determining by the subjecting to natural language processing;
  formulating respective contribution to the resalable return rate by each factor from the factors, wherein the formulating comprises assigning a first weight to the first factor, a second weight to the second factor, a third weight to the third factor, a fourth weight to the fourth factor, a fifth weight to the fifth factor;
  evaluating a first sales record of the item after a first sales period;
  adjusting the respective weights associated to the first through fifth factors based on the evaluating the first sales record of the item after a first sales period by use of a machine learning process upon completion of the first sales period the item;
performing evaluation of a second sales record of the item after a second sales period;
readjusting the respective weights associated to the first through fifth factors based on the performing evaluation of a second sales record of the item after a second sales period by use of the machine learning process upon completion of the second sales period the item;
predicting the resalable return rate by use of the respective contribution per factor for the factors as determined by the readjusting, and the data corresponding to the factors; and
performing adjustment of the number of total units of the item by a number of units of the item pursuant to the resalable return rate from the predicting, wherein the method includes applying data of the first through fifth factors as training data to the machine learning process and re-predicting the resalable return rate subsequent to the applying data of the first through fifth factors as training data to the machine learning process, wherein the re-predicting, by the applying data of the first through fifth factors as training data to the machine learning process, is more accurate than the predicting.

10. The computer program product of claim 9, wherein the method includes examining transaction history data of a certain user of the users who have ordered the item, determining that the certain user has immediately returned numerous past ordered acquired items, and increasing the total number of units of the item based on the determining that the certain user has immediately returned numerous past ordered acquired items.

11. The computer program product of claim 9, wherein the method further includes, adjusting a number of total units of a second item, the adjusting a number of total units of a second item comprising: identifying users who have ordered the second item; ascertaining items similar to the second item; finding unstructured data of the second item including unstructured data social media content relevant to the second item and unstructured data web searches for the second item; performing natural language processing on the unstructured data social media content relevant to the second item subjecting to natural language processing the unstructured data web searches for the second item; collecting data corresponding to a plurality of factors that affect a resalable return rate of the second item, wherein the resalable return rate indicates a rate of returned order for the second item in a resalable condition over an entire order for the second item, wherein the plurality of factors include (a) a first factor provided by a user transaction history indicates collective past transactions including past returns of acquired items other than the second item by the users who have ordered the second item, (b) a second factor provided by a comparable sales history that indicates collective sales histories and past patterns of returns of the items similar to the second item in terms of sales attributes, (c) a third factor provided by a sales attribute item that indicates a sales volume of the second item over a fixed period of time and whether the second item is seasonal or not seasonal, (d) a fourth factor provided by a social media factor indicating social media sentiment of the second item as determined by the performing natural language processing, and (e) a fifth factor provided by a web search activities factor indicating a web search sentiment of the second item as determining by the subjecting to natural language processing; wherein the item is not seasonable, and wherein the second item is seasonable, wherein the method includes determining that the second item is seasonable, and wherein the method includes responsively to the determining that the second item is seasonable, increasing the weight that is assigned to the fifth factor provided by a web search activities factor indicating a web search sentiment of the second item as determined by the subjecting to natural language processing.

12. The computer program product of claim 9, wherein the method includes examining transaction history data of a certain user of the users who have ordered the item.

13. The computer program product of claim 9, wherein the method further includes, adjusting a number of total units of a second item, the adjusting a number of total units of a second item comprising: identifying users who have ordered the second item; ascertaining items similar to the second item; finding unstructured data of the second item including unstructured data social media content relevant to the second item and unstructured data web searches for the second item; performing natural language processing on the unstructured data social media content relevant to the second item subjecting to natural language processing the unstructured data web searches for the second item.

14. The computer program product of claim 9, wherein the method further includes, adjusting a number of total units of a second item, the adjusting a number of total units of a second item comprising identifying users who have ordered the second item.

15. The computer program product of claim 9, wherein the method includes examining transaction history data of a certain user of the users who have ordered the item, determining that the certain user has immediately returned numerous past ordered acquired items, and increasing the total number of units of the item.

16. The computer program product of claim 9, wherein the method further includes, adjusting a number of total units of a second item, wherein the item is not seasonable, and wherein the second item is seasonable, wherein the method includes determining that the second item is seasonable, and wherein the method includes responsively to the determining that the second item is seasonable, increasing the weight that is assigned to a factor provided by a web search activities factor indicating a web search sentiment of the second item as determined by the subjecting to natural language processing.

17. A system comprising:
a memory;
one or more processor in communication with the memory; and
program instructions executable by the one or more processor via the memory to perform a method for adjusting a number of total units of an item, comprising:
identifying users who have ordered the item;
ascertaining items similar to the item;
finding unstructured data of the item including unstructured data social media content relevant to the item and unstructured data web searches for the item;
performing natural language processing on the unstructured data social media content relevant to the item subjecting to natural language processing the unstructured data web searches for the item;
collecting data corresponding to a plurality of factors that affect a resalable return rate of the item, wherein the resalable return rate indicates a rate of returned order for the item in a resalable condition over an entire order for the item, wherein the plurality of factors include (a) a first factor provided by a user transaction history indicates collective past transactions including past returns of acquired items other than the item by the users who have ordered the item, (b) a second factor provided by a comparable sales history that indicates collective sales histories and past patterns of returns of the items similar to the item in terms of sales attributes, (c) a third factor provided by a sales attribute item that indicates a sales volume of the item over a fixed period of time and whether the item is seasonal or not seasonal, (d) a fourth factor provided by a social media factor indicating social media sentiment of the item as determined by the performing natural language processing, and (e) a fifth factor provided by a web search activities factor indicating a web search sentiment of the item as determining by the subjecting to natural language processing;

formulating respective contribution to the resalable return rate by each factor from the factors, wherein the formulating comprises assigning a first weight to the first factor, a second weight to the second factor, a third weight to the third factor, a fourth weight to the fourth factor, a fifth weight to the fifth factor;

evaluating a first sales record of the item after a first sales period;

adjusting the respective weights associated to the first through fifth factors based on the evaluating the first sales record of the item after a first sales period by use of a machine learning process upon completion of the first sales period the item;

performing evaluation of a second sales record of the item after a second sales period;

readjusting the respective weights associated to the first through fifth factors based on the performing evaluation of a second sales record of the item after a second sales period by use of the machine learning process upon completion of the second sales period the item;

predicting the resalable return rate by use of the respective contribution per factor for the factors as determined by the readjusting, and the data corresponding to the factors; and performing adjustment of the number of total units of the item by a number of units of the item pursuant to the resalable return rate from the predicting, wherein the method includes applying data of the first through fifth factors as training data to the machine learning process and re-predicting the resalable return rate subsequent to the applying data of the first through fifth factors as training data to the machine learning process, wherein the re-predicting, by the applying data of the first through fifth factors as training data to the machine learning process, is more accurate than the predicting.

18. The system of claim 17, wherein the method includes examining transaction history data of a certain user of the users who have ordered the item, determining that the certain user has immediately returned numerous past ordered acquired items, and increasing the total number of units of the item based on the determining that the certain user has immediately returned numerous past ordered acquired items.

19. The system of claim 17, wherein the method further includes, adjusting a number of total units of a second item, the adjusting a number of total units of a second item comprising:

identifying users who have ordered the second item; ascertaining items similar to the second item; finding unstructured data of the second item including unstructured data social media content relevant to the second item and unstructured data web searches for the second item; performing natural language processing on the unstructured data social media content relevant to the second item subjecting to natural language processing the unstructured data web searches for the second item; collecting data corresponding to a plurality of factors that affect a resalable return rate of the second item, wherein the resalable return rate indicates a rate of returned order for the second item in a resalable condition over an entire order for the second item, wherein the plurality of factors include (a) a first factor provided by a user transaction history indicates collective past transactions including past returns of acquired items other than the second item by the users who have ordered the second item, (b) a second factor provided by a comparable sales history that indicates collective sales histories and past patterns of returns of the items similar to the second item in terms of sales attributes, (c) a third factor provided by a sales attribute item that indicates a sales volume of the second item over a fixed period of time and whether the second item is seasonal or not seasonal, (d) a fourth factor provided by a social media factor indicating social media sentiment of the second item as determined by the performing natural language processing, and (e) a fifth factor provided by a web search activities factor indicating a web search sentiment of the second item as determining by the subjecting to natural language processing, wherein the item is not seasonable, and wherein the second item is seasonable, wherein the method includes determining that the second item is seasonable, and wherein the method includes responsively to the determining that the second item is seasonable, increasing the weight that is assigned to the fifth factor provided by a web search activities factor indicating a web search sentiment of the second item as determined by the subjecting to natural language processing.

20. The system of claim 17, wherein the method includes examining transaction history data of a certain user of the users who have ordered the item.

* * * * *